US012030653B2

(12) United States Patent
Kita et al.

(10) Patent No.: US 12,030,653 B2
(45) Date of Patent: Jul. 9, 2024

(54) AIRCRAFT PROPULSION SYSTEM

(71) Applicant: HONDA MOTOR CO., LTD., Tokyo (JP)

(72) Inventors: Akinori Kita, Wako (JP); Takeshi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 17/898,501

(22) Filed: Aug. 30, 2022

(65) Prior Publication Data

US 2023/0076465 A1     Mar. 9, 2023

(30) Foreign Application Priority Data

Sep. 9, 2021   (JP) ................... 2021-146944

(51) Int. Cl.
| | |
|---|---|
| B64D 27/14 | (2006.01) |
| B64D 27/24 | (2024.01) |
| B64D 31/08 | (2006.01) |
| B64D 27/02 | (2006.01) |

(52) U.S. Cl.
CPC ............ B64D 27/14 (2013.01); B64D 27/24 (2013.01); B64D 31/08 (2013.01); B64D 27/026 (2024.01)

(58) Field of Classification Search
CPC ...... F02C 7/32; F02C 7/36; F02C 9/28; F05D 2270/024
See application file for complete search history.

(56) References Cited

U.S. PATENT DOCUMENTS

| | | | |
|---|---|---|---|
| 8,727,271 B2 | 5/2014 | Salyer | |
| 10,184,406 B2 * | 1/2019 | Kusumi | ............... H02K 7/1823 |
| 10,619,730 B2 * | 4/2020 | Lindström | ............. B60K 6/387 |
| 2008/0220933 A1 * | 9/2008 | Maeda | ................... B60W 10/10 |
| | | | 477/3 |
| 2019/0155318 A1 * | 5/2019 | Meunier | .................... F02C 9/28 |
| 2022/0120224 A1 * | 4/2022 | Cormier | .................... F02C 9/58 |

* cited by examiner

*Primary Examiner* — Thuyhang N Nguyen
(74) *Attorney, Agent, or Firm* — Amin, Turocy & Watson, LLP

(57) ABSTRACT

A load fluctuation detection unit that detects a load fluctuation of an aircraft, and an operating point control unit that controls a power operating point defined by a torque and rotation speed based on a flight state. The operating point control unit sets a target power operating point (62) for coping with a load with respect to an initial power operating point (61) in an operating point map (40) when the load has fluctuated. The operating point control unit moves the power operating point from the initial power operating point (61) on a first operating line (41) to the target power operating point (62) on a second operating line (42), to a return power operating point (63) on the first operating line (41) while keeping a torque T constant, and then to the initial power operating point (61) along the first operating line (41).

4 Claims, 4 Drawing Sheets

AIRCRAFT PROPULSION SYSTEM

CROSS-REFERENCE TO RELATED APPLICATION

Priority is claimed on Japanese Patent Application No. 2021-146944 filed Sep. 9, 2021, the content of which is incorporated herein by reference.

FIELD OF THE INVENTION

The present disclosure relates to an aircraft propulsion system.

BACKGROUND OF THE INVENTION

In the related art, various technologies for aircraft propulsion systems in which a generator is connected to a compressor or a turbine mounted on a fuselage of an aircraft or the like, and a plurality of propellers are driven by using electric power from the generator have been proposed.

For example, Patent Document 1 (U.S. Pat. No. 8,727,271) discloses a configuration of a propulsion system including a plurality of gas turbine engines, a generator that generates electricity according to operations of the gas turbine engines, and a battery that supplies power to a motor of a propeller. According to the technology described in Patent Document 1, it is possible to deal with various situations such as a failure of the gas turbine engine by using a hybrid type propulsion system obtained by combining the generator connected to the gas turbine engine with the battery.

SUMMARY OF THE INVENTION

It is desirable to maintain a fuselage of an aircraft by controlling rotation of a plurality of propellers at the time of takeoff and landing or hovering of the aircraft, and in this case, a spike-like load fluctuation may occur over a short period of time.

In the related art described in Patent Document 1 or the like, because it is not possible to follow such a spike-like load fluctuation by simply increasing or decreasing a fuel flow rate to the gas turbine engine, a shortage of electric power needs to be compensated for with electric power from the battery. That is, it is necessary to rely on the electric power from the battery to cope with the load fluctuation. Therefore, there is concern that a needed capacity of the battery becomes large, the battery and a cooling system therefor become large, and the weight of battery may have to be increased. In addition, there is concern that the life of the battery may be reduced.

Therefore, an object of the present disclosure is to provide an aircraft propulsion system capable of downsizing a battery and a cooling system therefor as compared with the related art and curbing a decrease in the life of the battery.

In order to solve the above problem, an aircraft propulsion system of the present disclosure has adopted the following configuration.

(1) The aircraft propulsion system according to an aspect of the present disclosure is mounted on a fuselage of an aircraft, and includes a gas turbine element including a compressor and a turbine rotating integrally with the compressor; a generator connected to the gas turbine element via a rotation shaft; a battery configured to store electric power generated by the generator; an electric motor driven by at least one of the electric power from the generator and the electric power from the battery; a propeller driven by the electric motor; a flight state detection unit configured to detect a flight state of the aircraft; a load fluctuation detection unit configured to detect a load fluctuation in an output of the aircraft based on the flight state detected by the flight state detection unit; and an operating point control unit configured to control a power operating point defined by a torque and rotation speed in the rotation shaft based on the flight state detected by the flight state detection unit; wherein the operating point control unit sets, in an operating point map on which the power operating points are mapped, a first operating line connecting a plurality of power operating points at which an output defined by a product of the torque and the rotation speed is constant, and a second operating line connecting a plurality of power operating points at which an output is different from the output of the first operating line and is constant, the operating point control unit sets a target power operating point for coping with a load with respect to an initial power operating point, the initial power operating point being a current power operating point in the operating point map when the load fluctuation detection unit detects that the load has fluctuated, and the operating point control unit moves the power operating point from the initial power operating point on the first operating line to the target power operating point on the second operating line while keeping the rotation speed constant, moves the power operating point from the target power operating point on the second operating line to a return power operating point on the first operating line while keeping the torque constant after moving the power operating point to the target power operating point, and moves the power operating point from the return power operating point on the first operating line to the initial power operating point along the first operating line after moving the power operating point to the return power operating point.

(2) In the aircraft propulsion system according to the aspect (1), when the load fluctuation detection unit detects that the load has increased, the operating point control unit may set the second operating line so that an output of the second operating line becomes higher than that of the first operating line.

(3) In the aircraft propulsion system according to the aspect (1), when the load fluctuation detection unit detects that the load has decreased, the operating point control unit may set the second operating line so that an output of the second operating line becomes lower than that of the first operating line.

(4) In the aircraft propulsion system according to the aspect (1), the load fluctuation detection unit may include a feedforward control unit configured to predict the load fluctuation through feedforward control, the feedforward control unit may predict the load fluctuation based on the flight state detected by the flight state detection unit, and the operating point control unit may control the power operating point based on the load fluctuation predicted by the feedforward control unit.

According to the aspect (1), when a load fluctuation occurs, the operating point control unit moves the power operating point between a plurality of operating lines to cope with an increase or decrease in the output due to the load fluctuation. Specifically, first, the operating point control unit moves the operating line from the power operating points (the initial power operating points) on the first operating line to the power operating points (the target power operating points) on the second operating line while keeping the rotation speed constant. Accordingly, the kinetic energy of the rotation shaft and the electric energy of the generator can be converted into each other, to thereby cope with a short-time load fluctuation. Thereafter, the operating point control unit changes the rotation speed while keeping the torque constant as the kinetic energy increases or decreases. That is, the operating point control unit moves the power operating point from the power operating points (the target power operating points) on the second operating line to the power operating point (the return power operating points) on the first operating line while keeping the torque constant. Accordingly, return to the original first operating line occurs while the rotation speed is being changed. Finally, the operating point control unit returns to the initial power operating points on the first operating line by changing the torque and the rotation speed along the first operating line from the return power operating points. Thus, the operating points are moved in order of the initial power operating points, the target power operating points, the return power operating points, the initial power operating points, making it possible to extract or store the kinetic energy of the rotation shaft between the gas turbine element and the generator as an output. That is, it is possible to cope with a spike-like load fluctuation by using the kinetic energy of the rotation shaft instead of electric power in and out of the battery. Therefore, it is not necessary to unnecessarily increase a size of the battery and it is possible to downsize the battery as compared with the related art that copes with load fluctuation with the electric power from the battery. Further, because a frequency of use of the battery is reduced, a cooling system regarding the battery can be miniaturized and a decrease in life of the battery can be curbed. Therefore, it is possible to provide the aircraft propulsion system capable of downsizing the battery and a cooling system therefor as compared with the related art and curbing a decrease in the life of the battery.

According to the aspect (2), when the load increases, the operating point control unit sets the second operating line so that an output of the second operating line becomes larger than an output of the first operating line. That is, the operating point control unit first moves the power operating points from the initial power operating points on the first operating line to the target power operating points on the second operating line while keeping the rotation speed constant. Accordingly, it is possible to increase the generated power on the generator side using the kinetic energy of the rotation shaft, and to cope with a load increase over a short time. Thereafter, the operating point control unit decreases the rotation speed as the kinetic energy decreases. That is, the operating point control unit moves the power operating points from the target power operating points on the second operating line to the return power operating points on the first operating line while keeping the torque constant. Accordingly, return to the original first operating line occurs while the rotation speed is being reduced. Finally, the operating point control unit returns to the initial power operating points by changing the torque and the rotation speed along the first operating line from the return power operating points. Thus, it is possible to extract the kinetic energy as electric energy by moving the operating points when the load increases. Therefore, it is possible to cope with an increase in load fluctuation without extracting the electric power from the battery.

According to the aspect (3), when the load decreases, the operating point control unit sets the second operating line so that the output of the second operating line becomes smaller than the output of the first operating line. That is, the operating point control unit first moves the power operating points from the initial power operating points on the first operating line to the target power operating points on the second operating line while keeping the rotation speed constant. This makes it possible for the generator to absorb (store) the excess kinetic energy remaining without power conversion as the kinetic energy of the rotation shaft in order to cope with the load decrease, and to cope with the load decrease over a short time. Thereafter, the operating point control unit increases the rotation speed according to the increase in kinetic energy. That is, the operating point control unit moves the power operating points from the target power operating points on the second operating line to the return power operating points on the first operating line while keeping the torque constant. Accordingly, return to the original first operating line occurs whiles the rotation speed is being increased. Finally, the operating point control unit returns to the initial power operating points by changing the torque and the rotation speed along the first operating line from the return power operating points. Thus, the generator can absorb (store) excess kinetic energy remaining without power conversion as the kinetic energy of the rotation shaft by moving the operating point when the load decreases. Therefore, it is possible to cope with the reduction of the load fluctuation without storing the electric power in the battery. Further, it is possible to use the kinetic energy absorbed at the time of a decrease in load as power generation energy in a case in which the load has increased. In this case, because the kinetic energy extracted when the load increases can be covered by the stored kinetic energy, it is possible to cope with the increase in the load without increasing the fuel flow rate. Therefore, deterioration of fuel efficiency can be curbed.

According to the aspect (4), the feedforward control unit that predicts the load fluctuation under feedforward control is included, and the operating point control unit controls the power operating point based on the load fluctuation predicted by the feedforward control unit. This makes it possible to cope with the load fluctuation in the specified output more rapidly. Therefore, the responsiveness of the aircraft propulsion system can be improved.

DETAILED DESCRIPTION OF THE INVENTION

Hereinafter, embodiments of the present disclosure will be described with reference to the drawings.

(Aircraft Propulsion System)

Figure 1:
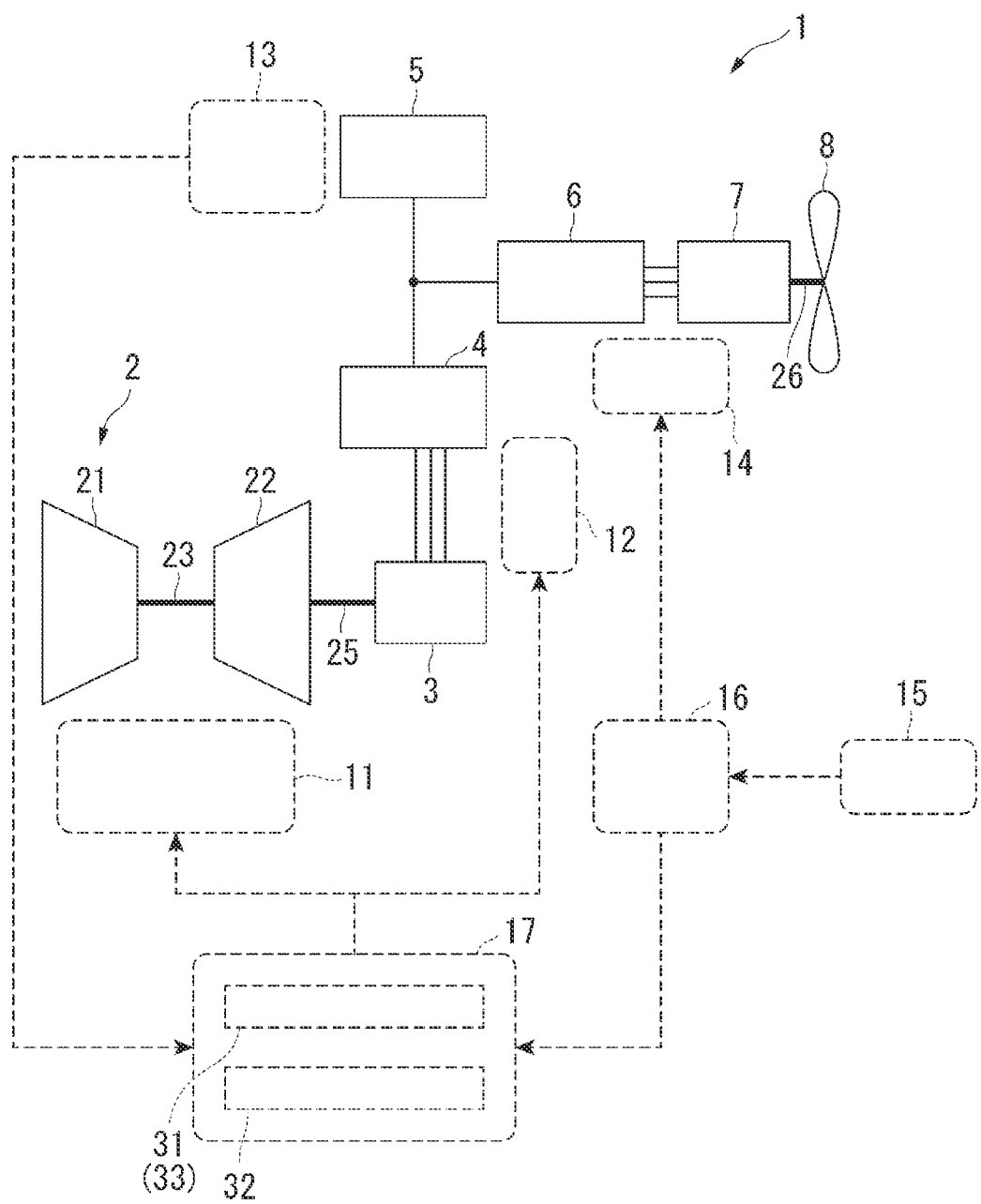
FIG. 1 is a schematic configuration diagram of an aircraft propulsion system according to an embodiment.

FIG. 1 is a schematic configuration diagram of an aircraft propulsion system 1 according to an embodiment.

The aircraft propulsion system 1 (hereinafter, this may be simply referred to as a propulsion system 1) is mounted on a fuselage of an aircraft (not shown). The propulsion system 1 is a hybrid propulsion system in which an aircraft is propelled by a plurality of electric motors 7 that are driven by electric power generated by a generator 3, which will be described below in detail. The aircraft propulsion system 1 includes a gas turbine element 2, a generator 3, a battery 5, an electric motor 7, a propeller 8, and a plurality of control units. The plurality of control units include a gas turbine ECU 11, a generator ECU 12, a battery monitoring unit 13, a motor ECU 14, a flight state detection unit 15, a flight controller 16, and a hybrid control unit 17.

(Gas Turbine Element)

The gas turbine element 2 is a so-called gas turbine engine including a compressor 21, a turbine 22, and a connection shaft 23. The compressor 21 compresses intake air sucked from ventilation holes (not shown) provided in a fuselage of the aircraft. The turbine 22 is connected to the compressor 21 and rotates integrally with the compressor 21. The connection shaft 23 connects the compressor 21 to the turbine 22. The compressor 21 is connected to one end of the connection shaft 23. The turbine 22 is connected to the other end of the connection shaft 23.

(Generator)

The generator 3 is connected to the gas turbine element 2 via a rotation shaft 25. The generator 3 and the gas turbine element 2 are directly connected via the rotation shaft 25 without a speed change mechanism or the like provided between these. Therefore, the generator 3 rotates integrally with the gas turbine element 2. The rotation shaft 25 is provided coaxially with the connection shaft 23 of the gas turbine element 2. The rotation shaft 25 and the connection shaft 23 may be integrated. The generator 3 generates electric power (alternating current electric power) according to driving of the turbine 22. The alternating current electric power generated by the generator 3 is converted into direct current electric power by a converter 4 of a power drive unit (PDU) and stored in the battery 5.

(Battery)

The electric power generated by the generator 3 is stored in the battery 5. When the generated power of the converter 4 exceeds power consumption of the inverter 6, the battery 5 absorbs surplus electric power and is charged. On the other hand, when the generated electric power of the converter 4 is lower than power consumption of the inverter 6, the battery 5 is discharged to supplement insufficient electric power.

(Electric Motor)

A plurality of electric motors 7 are provided for the fuselage. The electric motor 7 is, for example, a brushless DC motor having a rotor and a stator. A propeller shaft 26 that mechanically connects the electric motor 7 to the propeller 8 is provided between the electric motor 7 and the propeller 8. The propeller 8 rotates when the rotor of the electric motor 7 rotates in response to a control signal. The control signal is a signal for controlling the aircraft based on an operation of a pilot or an instruction in autopilot. The electric motor 7 is connected to the converter 4 (the generator 3) and the battery 5 via the inverter 6. At least one of the electric power discharged from the battery 5 and the electric power from the generator 3 is supplied to the electric motor 7 via the inverter 6. This drives the electric motor 7. The electric motor 7 may include an auxiliary motor for posture holding or for horizontal propulsion (not shown).

(Propeller)

The propeller 8 is provided in each of the plurality of electric motors 7. The rotation speed of each propeller 8 (that is, a rotation speed of the electric motor 7) can be controlled independently. The aircraft flies in a desired flight state by controlling the rotation speed of each propeller 8.

(Plurality of Control Units)

The gas turbine ECU 11 controls an operation of the gas turbine element 2. The gas turbine ECU 11 adjusts a rotation speed, a torque, and the like of the gas turbine element 2 to desired values by controlling, for example, an amount of air or a fuel flow rate Wf supplied to the gas turbine element 2. The generator ECU 12 controls an operation of the generator 3. The generator ECU 12 controls a magnitude of the regenerative torque for generating electricity using rotational force delivered from the gas turbine element 2 via the rotation shaft 25. The magnitude of the regenerative torque is proportional to a current value input to the generator 3. That is, the magnitude of the regenerative torque in the generator 3 can be controlled through adjustment of an amount of current input to the generator 3 by the generator ECU 12. Because the gas turbine element 2 and the generator 3 are directly connected by the rotation shaft 25, the rotation speed of the rotation shaft 25 (that is, the rotation speed of the gas turbine element 2 and the generator 3) decreases, for example, a regenerative torque of the generator 3 is increased from a steady state in which the torque T and the rotation speed Ne of the gas turbine element 2 and the generator 3 are constant. On the other hand, when the regenerative torque of the generator 3 decreases from the steady state, the rotation speed of the rotation shaft 25 increases.

The battery monitoring unit 13 monitors a state of electric power in the battery 5. The motor ECU 14 controls an operation of each of the plurality of electric motors 7. A plurality of motor ECUs 14 may be provided in correspondence to the respective electric motors 7. The motor ECU 14 rotates any of the electric motors 7 at a desired rotation speed by using at least one of the electric power from the battery 5 and the electric power from the generator 3.

The flight state detection unit 15 detects a flight state of the aircraft by acquiring detection results from various sensors mounted on the aircraft. Specifically, the flight state detection unit 15 acquires, for example, information such as a speed, posture, and altitude of the aircraft, and further calculates a specified output of the aircraft based on these pieces of information. The flight state detection unit 15 may further detect information such as instructions from a pilot or a flight path.

The flight controller 16 acquires a detection result of the flight state detection unit 15. The flight controller 16 determines the rotation speed of the propeller 8 based on the detection result, and, at the same time, calculates specified electric power. The flight controller 16 can communicate with the motor ECU 14 and the hybrid control unit 17 described below.

The hybrid control unit 17 communicates with the flight controller 16, the gas turbine ECU 11, the generator ECU 12, and the battery monitoring unit 13. The hybrid control unit 17 receives a signal from the flight controller 16 and transmits the signal to the flight controller 16. The hybrid control unit 17 transmits a command signal to the gas turbine ECU 11, the generator ECU 12 and the battery monitoring unit 13 based on information from the flight controller 16 and acquires a state of the gas turbine ECU 11, the generator ECU 12 and the battery monitoring unit 13. The hybrid control unit 17 includes a load fluctuation detection unit 31 and an operating point control unit 32.

The load fluctuation detection unit 31 detects a load fluctuation in the specified output for the aircraft based on the flight state of the aircraft detected by the flight state detection unit 15. The load fluctuation is fluctuation in the specified output that occurs when a load of the propeller 8 repeatedly increases and decreases over a short time due to, for example, disturbance caused by outside air during flight. For example, load fluctuation may occur when posture control at the time of hovering is performed. The load fluctuation occurs to repeatedly increase and decrease in a spike shape over a short time with respect to a basic load that is an average load when the aircraft performs various operations such as cruising, takeoff and landing, and hovering. That is, the load fluctuation is a difference with the basic load.

The load fluctuation detection unit 31 further includes a feedforward control unit 33. The feedforward control unit 33 performs feedforward control to predict the load fluctuation based on the flight state detected by the flight state detection unit 15.

Figure 2:
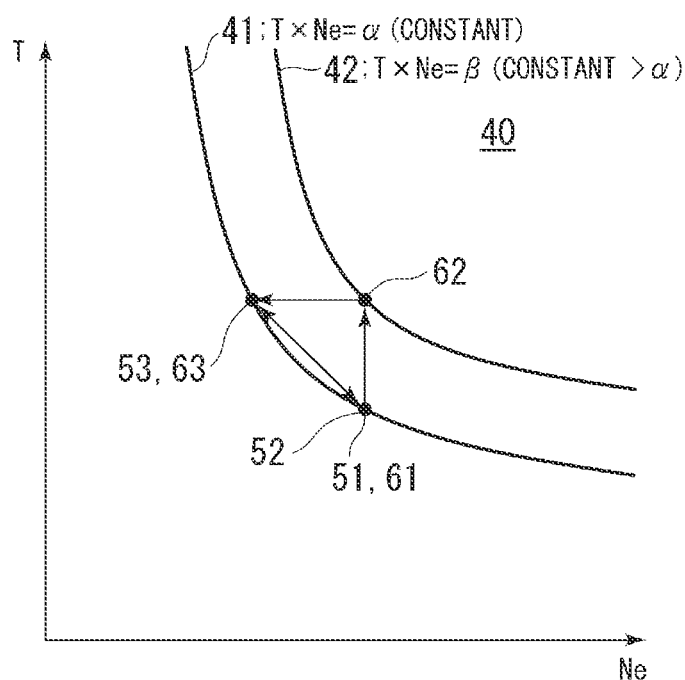
FIG. 2 is an operating point map showing control of an operating point control unit in a case in which a load increases.

FIG. 2 is an operating point map 40 showing control of the operating point control unit 32 in a case in which the load increases. The operating point control unit 32 controls the output with respect to the load fluctuation by controlling the power operating points of the gas turbine element 2 and the generator 3 based on the flight state detected by the flight state detection unit 15. The power operating point is a value indicating a predetermined output value defined by an arbitrary torque T and rotation speed Ne on the rotation shaft 25 of the generator 3. As shown in FIG. 2, the operating point control unit 32 includes a two-dimensional operating point map 40 in which a vertical axis indicates the torque T and a horizontal axis indicates the rotation speed Ne. In other words, a point uniquely determined on the operating point map 40 by a combination of an arbitrary torque T and rotation speed Ne is the power operating point, and the operating point control unit 32 can set (move) a power operating point at a desired place on the operating point map 40.

When the load fluctuation detection unit 31 detects that the load has fluctuated, the operating point control unit 32 moves a position of the power operating point in the operating point map 40. In the present embodiment, the operating point control unit 32 moves the position of the power operating point according to the load fluctuation predicted by the feedforward control unit 33.

Here, when the load fluctuation has been detected, the operating point control unit 32 sets a first operating line 41 and a second operating line 42 on the operating point map 40. The first operating line 41 is an inverse proportional curve connecting a plurality of power operating points at which an output value defined by a product of the torque and the rotation speed is constant. That is, the torque and the rotation speed at an arbitrary power operating point on the first operating line 41 are represented by T×Ne=α (constant). The second operating line 42 is an inverse proportional curve connecting a plurality of power operating points at which the output value defined by the product of the torque and the rotation speed is constant, similar to the first operating line 41. The output value in the second operating line 42 is different from that in the first operating line 41. That is, the torque and the rotation speed at an arbitrary power operating point on the second operating line 42 are represented by T×Ne=β (constant; α≠β).

When the load fluctuation increases, the first operating line 41 and the second operating line 42 are set so that α<β.

Figure 5:
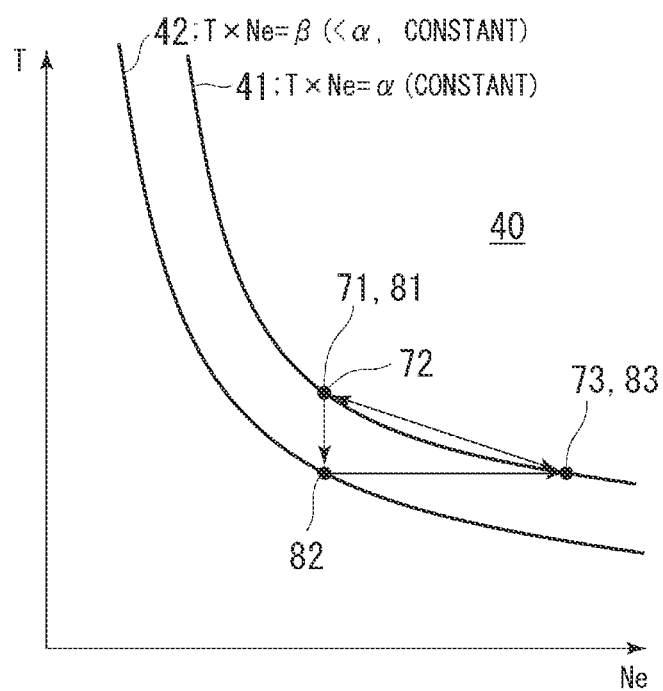
FIG. 5 is an operating point map showing control of the operating point control unit in a case in which the load decreases.

When the load fluctuation decreases, the first operating line 41 and the second operating line 42 are set so that α>β (see FIG. 5).

(Operation of the Operating Point Control Unit in a Case in which a Variable Load is Generated so that a Load Increases)

When the load fluctuation detection unit 31 detects the load fluctuation (increase), the operating point control unit 32 detects initial power operating points 51 and 61 on the operating point map 40, and also sets a target power operating points 62 and return power operating points 53 and 63. Reference signs 51, 52 and 53 in FIG. 2 indicate power operating points of the gas turbine element 2, and reference signs 61, 62 and 63 indicate power operating points of the generator 3.

The initial power operating points 51 and 61 are places at which the power operating points of the propulsion system 1 are located in a steady state before control for moving the power operating points is executed by the operating point control unit 32 and are current power operating points in the operating point map 40. The initial power operating points 51 and 61 are located on the first operating line 41. The target power operating point 62 is located on the second operating line 42. The target power operating point 62 is a power operating point having the same rotation speed as the initial power operating points 51 and 61 on the second operating line 42. The return power operating points 53 and 63 are located on the first operating line 41. The return power operating points 53 and 63 are power operating points having the same torque as the target power operating point 62 on the first operating line 41.

When the load fluctuation detection unit 31 detects that the load has fluctuated (increased), the operating point control unit 32 first sets the target power operating point 62 for coping with the load that has fluctuated with respect to the known initial power operating points 51 and 61.

Further, the operating point control unit 32 moves the power operating points from the initial power operating points 51 and 61 on the first operating line 41 to the target power operating point 62 (52) on the second operating line 42 while keeping the rotation speed constant. Thereafter, the operating point control unit 32 moves the power operating point from the target power operating point 62 on the second operating line 42 to the return power operating points 53 and 63 on the first operating line 41 while keeping the torque constant. Thereafter, the operating point control unit 32 moves the power operating point from the return power operating points 53 and 63 on the first operating line 41 to the initial power operating points 51 and 61 along the first operating line 41.

As described above, when the load fluctuation detection unit 31 detects the load fluctuation, the operating point control unit 32 moves the power operating points on the operating point map 40 in order of the initial power operating points 51 and 61, the target power operating point 62 (52), the return power operating points 53 and 63, and the initial power operating points 51 and 61. In particular, the operating point control unit 32 moves the power operating point in the generator 3 to control the generator 3 so that the electric power following the load fluctuation can be output.

(Control of the Operating Point Control Unit in a Case in which a Variable Load is Generated so that a Load Increases)

Next, control of the operating point control unit 32 in a case in which a variable load is generated so that a load increases will be described in more detail.

Figure 3:
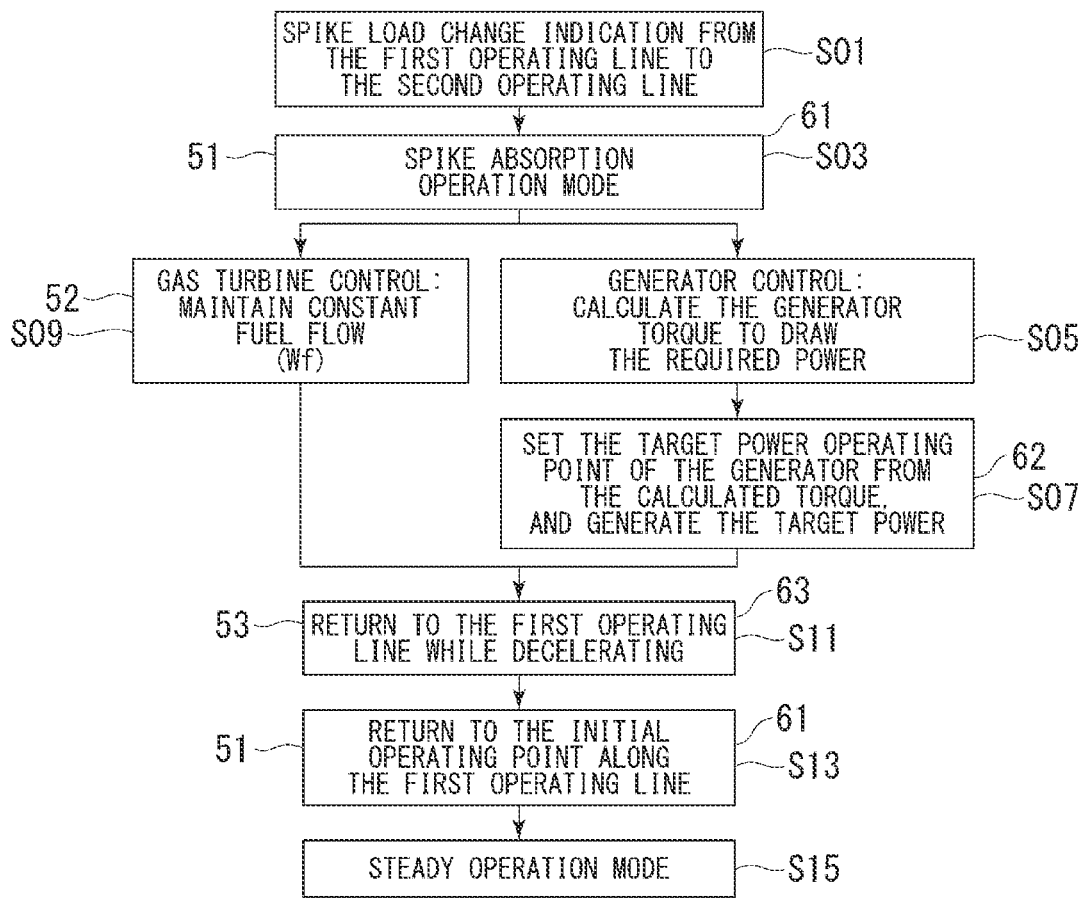
FIG. 3 is a block diagram of the operating point control unit in a case in which the load increases.

FIG. 3 is a block diagram of the operating point control unit 32 in a case in which the load increases. In FIG. 3, steps S05 and S07 are controls for the generator 3, and step S09 is control for the gas turbine element 2. Other steps S01, S03, S11, S13, and S15 represent common controls for both the generator 3 and the gas turbine element 2.

As shown in FIGS. 2 and 3, first, when the load fluctuation detection unit 31 detects that the load has increased, the operating point control unit 32 transmits a command signal so that a spike-like load fluctuation from the first operating line 41 to the second operating line 42 occurs (step S01). Here, as described above, when the load increases, the operating point control unit 32 sets the second operating line 42 so that an output of the second operating line 42 is larger than that of the first operating line 41 (see FIG. 2). That is, the second operating line 42 is set so that $\alpha<\beta$. Therefore, an output from the generator 3 increases by the power operating point being moved from the first operating line 41 to the second operating line 42.

When the second operating line 42 is set, the operating point control unit 32 then causes the propulsion system 1 to shift to an operation mode in which the spike-like load is absorbed (step S03). In this case, a power operating point 61 in the generator 3 and the power operating point 51 in the gas turbine element 2 match each other.

Then, the operating point control unit 32 calculates the torque of the generator 3 that causes the generator 3 to draw electric power specified to follow the load fluctuation (step S05). Further, the operating point control unit 32 sets the target power operating point 62 of the generator 3 from the torque calculated in step S05 and moves the power operating point. Specifically, the operating point control unit 32 moves the power operating point of the generator 3 from an initial power operating point 61 on the first operating line 41 to the target power operating point 62 on the second operating line 42 while keeping the rotation speed constant (step S07). The movement to the target power operating point 62 is realized by increasing the amount of current supplied from the generator ECU 12 to the generator 3 and increasing the magnitude of the regenerative torque in the generator 3. In this case, it is possible to supplement the increase in the load due to the load fluctuation using kinetic energy of the rotation shaft 25 by increasing the torque of the generator 3. The "kinetic energy of the rotation shaft 25" includes, for example, the kinetic energy of the entire rotation body including the compressor 21, the turbine 22, the connection shaft 23, the rotation shaft 25, and the generator 3.

The operating point control unit 32 performs control on the gas turbine element 2 so that the fuel flow rate Wf is kept constant, at the same time as the control of step S05 and step S07 (step S09). Because the fuel flow rate Wf is constant, an operating point in the gas turbine element 2 does not change and is located at the same power operating point 52 as the initial power operating point 51.

Then, the operating point control unit 32 performs control for return to the first operating line 41 while decelerating the rotation speed Ne on the generator 3 and the gas turbine element 2 (step S11). Specifically, the operating point control unit 32 moves the power operating point from the target power operating point 62 on the second operating line 42 to the return power operating point 63 on the first operating line 41 while keeping the torque T constant, with respect to the generator 3. Further, the operating point control unit 32 moves the power operating point from the power operating point 52 on the first operating line 41 to the return power operating point 53 on the first operating line 41 with respect to the gas turbine element 2. Accordingly, the return power operating point 63 in the generator 3 and the return power operating point 53 in the gas turbine element 2 match each other.

Then, the operating point control unit 32 performs control for return of the power operating point to the initial power operating points 51 and 61 along the first operating line 41 on the generator 3 and the gas turbine element 2 (step S13). Specifically, the operating point control unit 32 moves the power operating point of the generator 3 and the gas turbine element 2 from the return power operating points 53 and 63 on the first operating line 41 to the initial power operating points 51 and 61 along the first operating line 41. Because the gas turbine element 2 is accelerated while compensating for lost kinetic energy when return to the initial power operating points 51 and 61 occurs, the fuel flow rate Wf supplied to the gas turbine element 2 increases.

After return to the initial power operating points 51 and 61, the operating point control unit 32 causes the propulsion system 1 to shift to a steady operation mode and ends the control for moving the power operating points (step S15).

Figure 4:
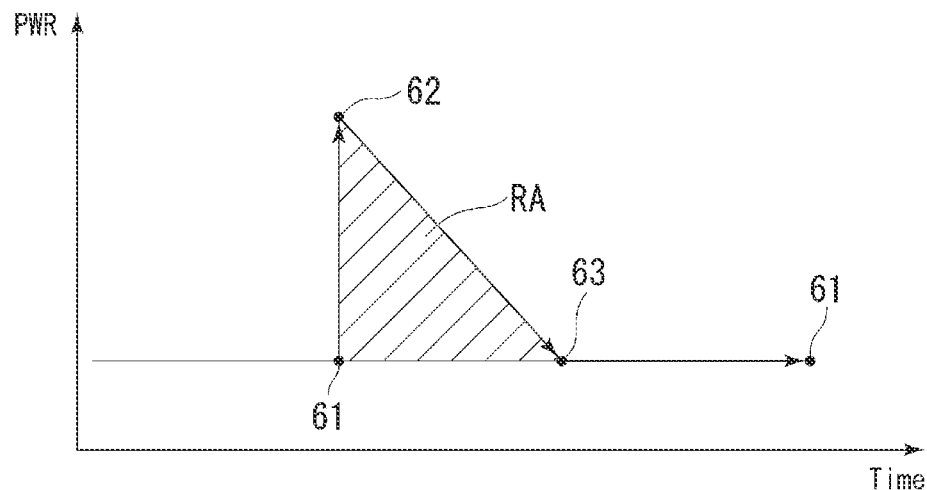
FIG. 4 is a graph showing an amount of kinetic energy extracted in a case in which the load increases.

FIG. 4 is a graph showing an amount of kinetic energy extracted in a case in which the load increases. As shown in FIG. 4, power operating points of the generator 3 move in order of an initial power operating point 61, a target power operating point 62, a return power operating point 63, and the initial power operating point 61 under the above control. Accordingly, the kinetic energy of the rotation shaft 25 having a magnitude corresponding to a region RA surrounded by the respective power operating points in FIG. 4 is converted by the generator 3 and extracted as electric energy. The extracted electric energy is allocated to an increase in the load, making it possible to rapidly follow the output with respect to the increase in the load without using the electric power of the battery 5.

(Operation of the Operating Point Control Unit in a Case in which a Variable Load is Generated so that a Load Decreases)

Next, an operation of the operating point control unit in a case in which a variable load is generated so that the load decreases will be described. FIG. 5 is an operating point map 40 showing control of the operating point control unit 32 in a case in which the load decreases. When the load fluctuation detection unit 31 detects the load fluctuation (increase), the operating point control unit 32 detects initial power operating points 71 and 81 on the operating point map 40, and also sets the target power operating point 82 and the return power operating points 73 and 83. Reference signs 71, 72, and 73 in FIG. 5 indicate power operating points of the gas turbine element 2, and reference signs 81, 82, and 83 indicate power operating points of the generator 3.

The initial power operating points 71 and 81 are places at which the power operating points of the propulsion system 1 are located in a steady state before the control for moving the power operating points is executed by the operating point control unit 32 and are current power operating points in the operating point map 40. The initial power operating points 71 and 81 are located on the first operating line 41. A target power operating point 82 is located on the second operating line 42. The target power operating point 82 is a power operating point having the same rotation speed as the initial power operating points 71 and 81 on the second operating line 42. The return power operating points 73 and 83 are located on the first operating line 41. The return power operating points 73 and 83 are power operating points having the same torque as the target power operating point 82 on the first operating line 41.

When the load fluctuation detection unit 31 detects that the load has fluctuated (decreased), the operating point control unit 32 first sets the target power operating point 82 for coping with the load that has fluctuated with respect to the known initial power operating points 71 and 81.

Further, the operating point control unit 32 moves the power operating point from the initial power operating points 71 and 81 on the first operating line 41 to the target power operating point 82 (72) on the second operating line 42 while keeping the rotation speed constant. Thereafter, the operating point control unit 32 moves the power operating point from the target power operating point 82 on the second operating line 42 to the return power operating points 73 and 83 on the first operating line 41 while keeping the torque constant. Thereafter, the operating point control unit 32 moves the power operating point from the return power operating points 73 and 83 on the first operating line 41 to the initial power operating points 71 and 81 along the first operating line 41.

As described above, when the load fluctuation detection unit 31 detects the load fluctuation, the operating point control unit 32 moves the power operating points on the operating point map 40 in order of the initial power operating points 71 and 81, the target power operating point 82 (72), the return power operating points 73 and 83, and the initial power operating points 71 and 81. In particular, the operating point control unit 32 moves the power operating point in the generator 3 to control the generator 3 so that the electric power following the load fluctuation can be output. (Control of the Operating Point Control Unit in a Case in which a Variable Load is Generated so that a Load Decreases)

Next, control of the operating point control unit 32 in a case in which a variable load is generated so that a load decreases will be described.

Figure 6:
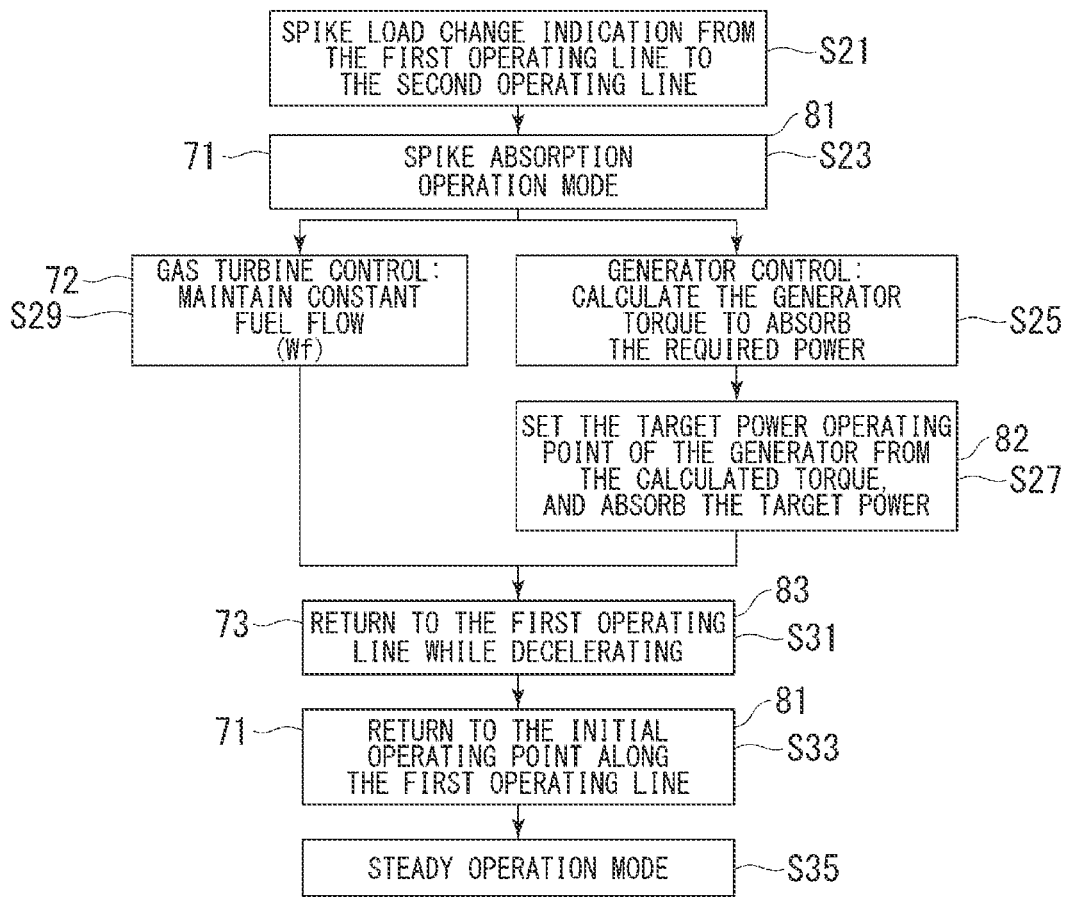
FIG. 6 is a block diagram of the operating point control unit in a case in which the load decreases.

FIG. 6 is a block diagram of the operating point control unit 32 in a case in which the load decreases. In FIG. 6, steps S25 and S27 are controls for the generator 3, and step S29 is control for the gas turbine element 2. Other steps S21, S23, S31, S33, and S35 represent common controls for both the generator 3 and the gas turbine element 2.

As shown in FIGS. 5 and 6, first, when the load fluctuation detection unit 31 detects that the load has decreased, the operating point control unit 32 transmits a command signal so that a spike-like load fluctuation from the first operating line 41 to the second operating line 42 is performed (step S21). Here, as described above, when the load decreases, the operating point control unit 32 sets the second operating line 42 so that the output of the second operating line 42 is smaller than the output of the first operating line 41 (see FIG. 5). That is, the second operating line 42 is set so that α>β. Therefore, the output from the generator 3 is reduced by the power operating point being moved from the first operating line 41 to the second operating line 42.

When the second operating line 42 is set, the operating point control unit 32 then causes the propulsion system 1 to shift to operation mode in which the spike-like load is absorbed (step S23). In this case, the power operating point 81 in the generator 3 and the power operating point 71 in the gas turbine element 2 match each other.

Then, the operating point control unit 32 calculates the torque of the generator 3 that can absorb electric power needed to follow the load fluctuation with respect to the generator 3 (step S25). Further, the operating point control unit 32 sets the target power operating point 82 of the generator 3 from the torque calculated in step S25 and moves the power operating point. Specifically, the operating point control unit 32 moves the power operating point of the generator 3 from the initial power operating point 81 on the first operating line 41 to the target power operating point 82 on the second operating line 42 while keeping the rotation speed constant (step S27). The movement to the target power operating point 82 is realized by reducing the amount of current supplied from the generator ECU 12 to the generator 3 and reducing the magnitude of the regenerative torque in the generator 3. In this case, by the torque T of the generator 3 being reduced, it is possible to absorb a decrease in load due to the load fluctuation with the kinetic energy of the rotation shaft 25.

The operating point control unit 32 performs control on the gas turbine element 2 so that the fuel flow rate Wf is kept constant at the same time as the control of step S25 and step S27 (step S29). Because the fuel flow rate Wf is constant, an operating point in the gas turbine element 2 does not change and is located at the same power operating point 72 as the initial power operating point 71.

Then, the operating point control unit 32 performs control for return to the first operating line 41 while accelerating the rotation speed Ne on the generator 3 and the gas turbine element 2 (step S31). Specifically, the operating point control unit 32 moves the power operating point from the target power operating point 82 on the second operating line 42 to a return power operating point 83 on the first operating line 41 while keeping the torque T constant with respect to the generator 3. Further, the operating point control unit 32 moves the power operating point of the gas turbine element 2 from the power operating point 72 on the first operating line 41 to a return power operating point 73 on the first operating line 41. Accordingly, the return power operating point 83 in the generator 3 and the return power operating point 73 in the gas turbine element 2 match each other.

Then, the operating point control unit 32 performs control for return of the power operating point to the initial power operating points 71 and 81 along the first operating line 41 on the generator 3 and the gas turbine element 2 (step S33). Specifically, the operating point control unit 32 moves the power operating point of the generator 3 and the gas turbine element 2 from the return power operating points 73 and 83 on the first operating line 41 to the initial power operating points 71 and 81 along the first operating line 41. Because the stored kinetic energy is released when return to the initial power operating points 51 and 61 occurs, the fuel flow rate Wf supplied to the gas turbine element 2 decreases.

After return to the initial power operating points 71 and 81, the operating point control unit 32 causes the propulsion system 1 to shift to a steady operation mode and ends the control for moving the power operating points (step S35).

Figure 7:
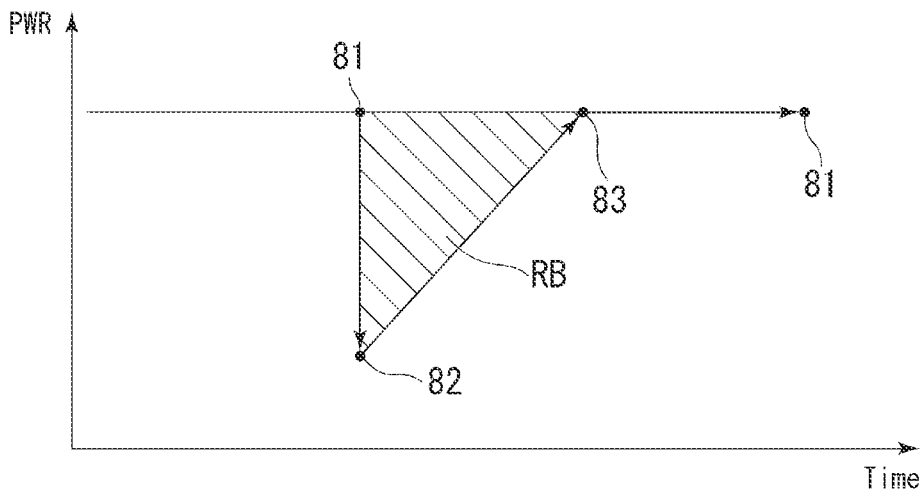
FIG. 7 is a graph showing an amount of kinetic energy absorbed in a case in which the load decreases.

FIG. 7 is a graph showing an amount of kinetic energy that is absorbed in a case in which the load decreases. As shown in FIG. 7, power operating points of the generator 3 move in order of initial power operating points 71 and 81, target power operating points 72 and 82, return power operating points 73 and 83, and the initial power operating points 71 and 81 under the above-described control. Accordingly, electric energy having a magnitude corresponding to a region RB surrounded by the respective power operating points in FIG. 7 is recovered as the kinetic energy of the rotation shaft 25. This makes it possible to rapidly follow the output with respect to the decrease in load without storing extra power in the battery 5.

Further, the recovered kinetic energy can be used as kinetic energy extracted in a case in which the load increases. In other words, the kinetic energy corresponding to the region RB of FIG. 7 can be used as the kinetic energy corresponding to the region RA in FIG. 4. It becomes possible to perform control of the operating point control unit 32 while substantially keeping the fuel flow rate Wf used for control for the load fluctuation constant by using kinetic energy recovered at the time of load decrease as kinetic energy at the time of load increase because the load fluctuation repeatedly increases or decreases over a short period of time.

(Operation and Effects)

Next, an operation and effects of the above-described propulsion system 1 will be described. According to the propulsion system 1 of the present embodiment, when a load fluctuation occurs, the operating point control unit 32 moves the power operating point between a plurality of operating lines 41 and 42 to cope with an increase or decrease in the output due to the load fluctuation. Specifically, first, the operating point control unit 32 moves the operating line from the power operating point (the initial power operating points 51, 61, 71, and 81) on the first operating line 41 to the power operating point (the target power operating points 52, 62, 72, and 82) on the second operating line 42 while keeping the rotation speed Ne constant. Accordingly, the kinetic energy of the rotation shaft 25 and the electric energy of the generator 3 can be converted into each other, to thereby cope with a short-time load fluctuation. Thereafter, the operating point control unit 32 changes the rotation speed Ne while keeping the torque T constant as the kinetic energy increases or decreases. That is, the operating point control unit 32 moves the power operating point from the power operating point (the target power operating points 52, 62, 72, and 82) on the second operating line 42 to the power operating point (the return power operating points 53, 63, 73, and 83) on the first operating line 41 while keeping the torque constant. Accordingly, return to the original first operating line 41 occurs while the rotation speed Ne is being changed. Finally, the operating point control unit 32 returns to the initial power operating points 51, 61, 71, and 81 on the first operating line 41 by changing the torque T and the rotation speed Ne along the first operating line 41 from the return power operating points 53, 63, 73, and 83. Accordingly, it is possible to realize an operation at a more efficient operating point even on the same operating line. Thus, the operating points are moved in order of the initial power operating points 51, 61, 71, and 81, the target power operating points 52, 62, 72, and 82, the return power operating points 53, 63, 73, and 83, the initial power operating points 51, 61, 71, and 81, making it possible to extract or store the kinetic energy of the rotation shaft 25 between the gas turbine element 2 and the generator 3 as an output. That is, it is possible to cope with the spike-like load fluctuation by using the kinetic energy of the rotation shaft 25 instead of electric power in and out of the battery 5. Therefore, it is not necessary to unnecessarily increase a size of the battery 5 and it is possible to downsize the battery 5 as compared with the related art that copes with load fluctuation with the electric power from the battery 5. Further, because a frequency of use of the battery 5 is reduced, a cooling system regarding the battery 5 can be miniaturized and a decrease in life of the battery 5 can be curbed. Therefore, it is possible to provide the aircraft propulsion system 1 capable of downsizing the battery 5 and a cooling system therefor as compared with the related art and curbing a decrease in the life of the battery 5.

When the load increases, the operating point control unit 32 sets the second operating line 42 so that an output value 13 of the second operating line 42 becomes larger than an output value a of the first operating line 41. That is, the operating point control unit 32 first moves the power operating points from the initial power operating points 51 and 61 on the first operating line 41 to the target power operating points 52 and 62 on the second operating line 42 while keeping the rotation speed Ne constant. Accordingly, it is possible to increase the generated power on the generator 3 side using the kinetic energy of the rotation shaft 25, and to cope with a load increase over a short period of time. Thereafter, the operating point control unit 32 decreases the rotation speed Ne as the kinetic energy decreases. That is, the operating point control unit 32 moves the power operating points from the target power operating points 52 and 62 on the second operating line 42 to the return power operating points 53 and 63 on the first operating line 41 while keeping the torque T constant. Accordingly, return to the original first operating line 41 occurs while the rotation speed Ne is being reduced. Finally, the operating point control unit 32 returns to the initial power operating points 51 and 61 by changing the torque T and the rotation speed Ne along the first operating line 41 from the return power operating points 53 and 63. Thus, it is possible to extract the kinetic energy as electric energy by moving the operating points when the load increases. Therefore, it is possible to cope with an increase in load fluctuation without extracting the electric power from the battery 5.

When the load decreases, the operating point control unit 32 sets the second operating line 42 so that the output value 13 of the second operating line 42 becomes smaller than the output value a of the first operating line 41. That is, the operating point control unit 32 first moves the power operating points from the initial power operating points 71 and 81 on the first operating line 41 to the target power operating points 72 and 82 on the second operating line 42 while keeping the rotation speed Ne constant. This makes it possible for the generator 3 to absorb (store) the excess kinetic energy remaining without power conversion as the kinetic energy of the rotation shaft 25 in order to cope with the load decrease, and to cope with the load decrease over a short time. Thereafter, the operating point control unit 32 increases the rotation speed Ne according to the increase in kinetic energy. That is, the operating point control unit 32 moves the power operating points from the target power operating points 72 and 82 on the second operating line 42 to the return power operating points 73 and 83 on the first operating line 41 while keeping the torque T constant. Accordingly, return to the original first operating line 41 occurs whiles the rotation speed Ne is being increased. Finally, the operating point control unit 32 returns to the initial power operating points 71 and 81 by changing the torque T and the rotation speed Ne along the first operating line 41 from the return power operating points 73 and 83. Thus, the generator 3 can absorb (store) excess kinetic energy remaining without power conversion as the kinetic energy of the rotation shaft 25 by moving the operating point when the load decreases. Therefore, it is possible to cope with the reduction of the load fluctuation without storing the electric power in the battery 5. Further, it is possible to use the kinetic energy absorbed at the time of a decrease in load as power generation energy in a case in which the load has increased. In this case, because the kinetic energy extracted when the load increases can be covered by the stored kinetic energy, it is possible to cope with the increase in the load without increasing the fuel flow rate Wf. Therefore, deterioration of fuel efficiency can be curbed.

The load fluctuation detection unit 31 includes the feedforward control unit 33 that predicts the load fluctuation under feedforward control, and the operating point control unit 32 controls the power operating point based on the load fluctuation predicted by the feedforward control unit 33. This makes it possible to cope with the load fluctuation in the specified output more rapidly. Therefore, the responsiveness of the aircraft propulsion system 1 can be improved.

A technical scope of the present disclosure is not limited to the above-described embodiment, and various modifications can be made without departing from the spirit of the present disclosure. For example, the configuration having a single gas turbine element 2 has been described in the above-described embodiment, but the propulsion system 1 may include a plurality of gas turbine elements 2. That is, the propulsion system 1 may include a plurality of gas turbine elements 2, a plurality of gas turbine ECUs 11 corresponding to the respective gas turbine elements 2, a generator 3, a converter 4, and a generator ECU 12. The propulsion system 1 may include a plurality of batteries 5 (and a battery monitoring unit 13). The propulsion system 1 may include a plurality of inverters 6, a plurality of electric motors 7 (and a motor ECU 14), and a plurality of propellers 8 corresponding to the respective electric motors 7. The generator 3 may be disposed between the compressor 21 and the turbine 22 in an axial direction.

When the load increases, control of moving the power operating points from the return power operating points 53 and 63 to the initial power operating points 51 and 61 may be omitted. In this case, waiting at the return power operating points 53 and 63 until the control under the situation when the load has decreased is executed, and when the load decrease is detected, the power operating points are moved from the initial power operating points 71 and 81 to the return power operating points 73 and 83, for replacement of the movement from the return power operating points 53 and 63 to the initial power operating points 51 and 61 when the load increases. That is, the return power operating points 53 and 63 in a case in which the load has increased and the initial power operating points 71 and 81 in a case in which the load has decreased may be assumed to match each other, and extraction and absorption of the kinetic energy may be performed alternately. With such a configuration, as described above, because the fuel flow rate Wf according to the movement of the power operating point can be made constant, it is possible to curb fuel consumption.

In addition, it is possible to appropriately replace the components in the above-described embodiment with well-known components without departing from the spirit of the present disclosure, and the above-described embodiment may be combined appropriately.

While preferred embodiments of the invention have been described and illustrated above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description and is only limited by the scope of the appended claims.

EXPLANATION OF REFERENCES

1 Aircraft propulsion system
2 Gas turbine element
3 Generator
5 Battery
7 Electric motor
8 Propeller
15 Flight state detection unit
21 Compressor
22 Turbine
25 Rotation shaft
31 Load fluctuation detection unit
32 Operating point control unit
33 Feedforward control unit
40 Operating point map
41 First operating line
42 Second operating line
51, 61, 71, 81 Initial power operating point (power operating point)
52, 62, 72, 82 Target power operating point (power operating point)
53, 63, 73, 83 Return power operating point (power operating point)
T Torque
Ne Rotation speed

What is claimed is:

1. An aircraft propulsion system mounted on a fuselage of an aircraft, the aircraft propulsion system comprising:
   a gas turbine element including a compressor and a turbine rotating integrally with the compressor;
   a generator connected to the gas turbine element via a rotation shaft;
   a battery configured to store electric power generated by the generator;
   an electric motor driven by at least one of the electric power from the generator and the electric power from the battery;
   a propeller driven by the electric motor;
   a flight state detection unit configured to detect a flight state of the aircraft;
   a load fluctuation detection unit configured to detect a load fluctuation in a specified output of the aircraft based on the flight state detected by the flight state detection unit; and
   an operating point control unit configured to control an operation of the generator based on a control, by the operating point control unit, of a power operating point defined by a torque and rotation speed of the rotation shaft based on the flight state detected by the flight state detection unit;
   wherein the operating point control unit sets, in an operating point map on which the power operating points are mapped,
   a first operating line connecting a first plurality of power operating points at which a first output, defined by a product of the torque and the rotation speed, is constant, and
   a second operating line connecting a second plurality of power operating points at which a second output is different from the first output of the first operating line and in which the second output is constant,
   wherein the operating point control unit sets a target power operating point for coping with a load with respect to an initial power operating point, the initial power operating point being a current power operating point in the operating point map when the load fluctuation detection unit detects that the load has fluctuated, and
   wherein the operating point control unit
      moves the current power operating point from the initial power operating point on the first operating line to the target power operating point on the second operating line while keeping a rotation speed at the operating point map constant,
      moves the power operating point from the target power operating point on the second operating line to a return power operating point on the first operating line while keeping a torque at the operating point map constant, after moving the power operating point to the target power operating point, and moves the power operating point from the return power operating point on the first operating line to the initial power operating point along the first operating line, after moving the power operating point to the return power operating point.

2. The aircraft propulsion system according to claim 1, wherein, when the load fluctuation detection unit detects that the load increases, the operating point control unit sets the second operating line so that an output of the second operating line becomes higher than that of the first operating line.

3. The aircraft propulsion system according to claim 1, wherein, when the load fluctuation detection unit detects that the load decreases, the operating point control unit sets the second operating line so that an output of the second operating line becomes lower than that of the first operating line.

4. The aircraft propulsion system according to claim 1,
wherein the load fluctuation detection unit includes a feedforward control unit configured to predict the load fluctuation through feedforward control, wherein the feedforward control unit predicts the load fluctuation based on the flight state detected by the flight state detection unit, and wherein the operating point control unit controls the power operating point based on the load fluctuation predicted by the feedforward control unit.

* * * * *